United States Patent
Strasser

[19]

[11] Patent Number: 6,029,118
[45] Date of Patent: Feb. 22, 2000

[54] DEVICE AND METHOD FOR POSITION MEASURING

[75] Inventor: Erich Strasser, Trostberg, Germany

[73] Assignee: Dr. Johannes Heidenhain GmbH, Traunreut, Germany

[21] Appl. No.: 08/942,909

[22] Filed: Oct. 2, 1997

[30] Foreign Application Priority Data

Oct. 4, 1996 [DE] Germany .................. 196 41 035

[51] Int. Cl.[7] .................................................. G01B 11/00
[52] U.S. Cl. ..................... 702/94; 702/150; 702/151; 33/706; 33/707
[58] Field of Search ........................ 702/94, 150–151; 33/706–710; 250/231.16, 231.18, 237 G; 356/373, 374

[56] References Cited

U.S. PATENT DOCUMENTS

| | | | |
|---|---|---|---|
| 4,490,914 | 1/1985 | Spies | 33/710 |
| 4,628,201 | 12/1986 | Schmitt | 250/237 G |
| 5,216,626 | 6/1993 | Kranitzky | 702/151 |
| 5,279,044 | 1/1994 | Bremer | 33/707 |
| 5,294,793 | 3/1994 | Schwaiger et al. | 250/231.16 |
| 5,726,445 | 3/1998 | Thaler et al. | 250/237 G |

FOREIGN PATENT DOCUMENTS 0256 229 B1  2/1988  European Pat. Off. .

OTHER PUBLICATIONS

U. Tietze, et al., "Halbleiter—Schaltungestechnik," 10th edition, pp. 9–13 and 143–155, 1993 (No English Translation).

*Primary Examiner*—Marc S. Hoff
*Assistant Examiner*—Bryan Bui
*Attorney, Agent, or Firm*—Brinks Hofer Gilson & Lione

[57] ABSTRACT

An absolute position-measuring device has several graduation tracks with different graduation periods. Because of the low-pass filter behavior of the scanning elements, scanning signals with a high frequency are effected in the phase. A correction device is provided to compensate this frequency-dependent phase shift ($\phi$). As a function of the instantaneous frequency (f) of the scanning signal, the phase of the latter is corrected by a correction value ($\phi$) stored in the correction device.

11 Claims, 3 Drawing Sheets

DEVICE AND METHOD FOR POSITION MEASURING

FIELD OF THE INVENTION

The invention relates to a device and method for position measuring having a scale with several graduation tracks of different periods which are scanned by several scanning elements to generate position-dependent signals where at least one of the signals of one scanning element is input to a correcting device for correcting a frequency-dependent phase shift.

BACKGROUND OF THE INVENTION

In known position measuring systems a scale having a graduation track thereon is scanned by a scanning unit which is displaceable relative to the scale. To measure an absolute position, several graduations arranged parallel to each other and having different resolution are provided. The scanning elements of the scanning unit read the graduations and generate electrical scanning signals of different periods which are linked with each other in an evaluation unit to determine the absolute position of the scanning unit with relation to the scale as is well known.

The scanning elements themselves, as well as the entire circuitry of the scanning elements, exhibit a frequency-dependent low-pass filter behavior. With increasing frequency of the scanning signals, this low-pass filter behavior causes increasing phase shifting and thus a phase error between the individual scanning signals of different frequency. The behavior and the properties of low-pass filters are described in the book by U. Tietze et al. entitled "Halbleiter-Schaltungstechnik" [Semiconductor Circuit Technology], 10th ed., pp. 9–13 and 143–155 (1993).

To compensate for the frequency-dependent phase shift of the individual scanning signals during position measurement it has been proposed to assign a summing time member to the scanning elements as described in European Patent Publication No. EP 0 256 229 B1. These summing time members are in the form of amplifiers, RC networks or all-pass circuits and are relatively expensive circuits with large space requirements. Since these circuits themselves also display frequency-dependent behavior, an exact optimization is difficult to realize and is only possible within a very limited frequency range. Furthermore, downstream-connected circuits with negative feedback tend to oscillate.

Thus, it is desirable to provide a position-measuring device and method in which the frequency-dependent effects on the scanning signals are compensated effectively and in a simple manner.

SUMMARY OF THE INVENTION

According to a first aspect of the present invention there is provided a position-measuring device with a scale having several graduation tracks of different graduation periods, which are scanned by several scanning elements for the generation of position-dependent electrical scanning signals. The device includes a correcting device for correcting a frequency-dependent phase shift, a first module for the determination of the instantaneous frequency of one of the scanning signals, and a second module coupled to the first module and receiving the instantaneous frequency from the first module which, as a function of the instantaneous frequency, outputs a correction value ($\phi$), which is combined in a linkage circuit with one of the scanning signals, and that the second module has a memory, in which at least one value, which defines the phase shift of a scanning element, is stored.

According to a second aspect of the present invention there is provided a position-measuring method wherein several graduation tracks of a scale are scanned by several scanning elements of a scanning device and several electrical scanning signals are generated by means of this, wherein a frequency-dependent phase shift of at least one of the scanning signals of a scanning element is corrected in a correction device. The method includes the steps of determining the instantaneous frequency of one of the scanning signals, determining a correction value ($\phi$) as a function of the instantaneous frequency (f), and correcting at least one of the scanning signals by linkage of the instantaneous value of the scanning signal with the correction value ($\phi$).

DETAILED DESCRIPTION OF THE PRESENTLY PREFERRED EMBODIMENTS

Figure 1:
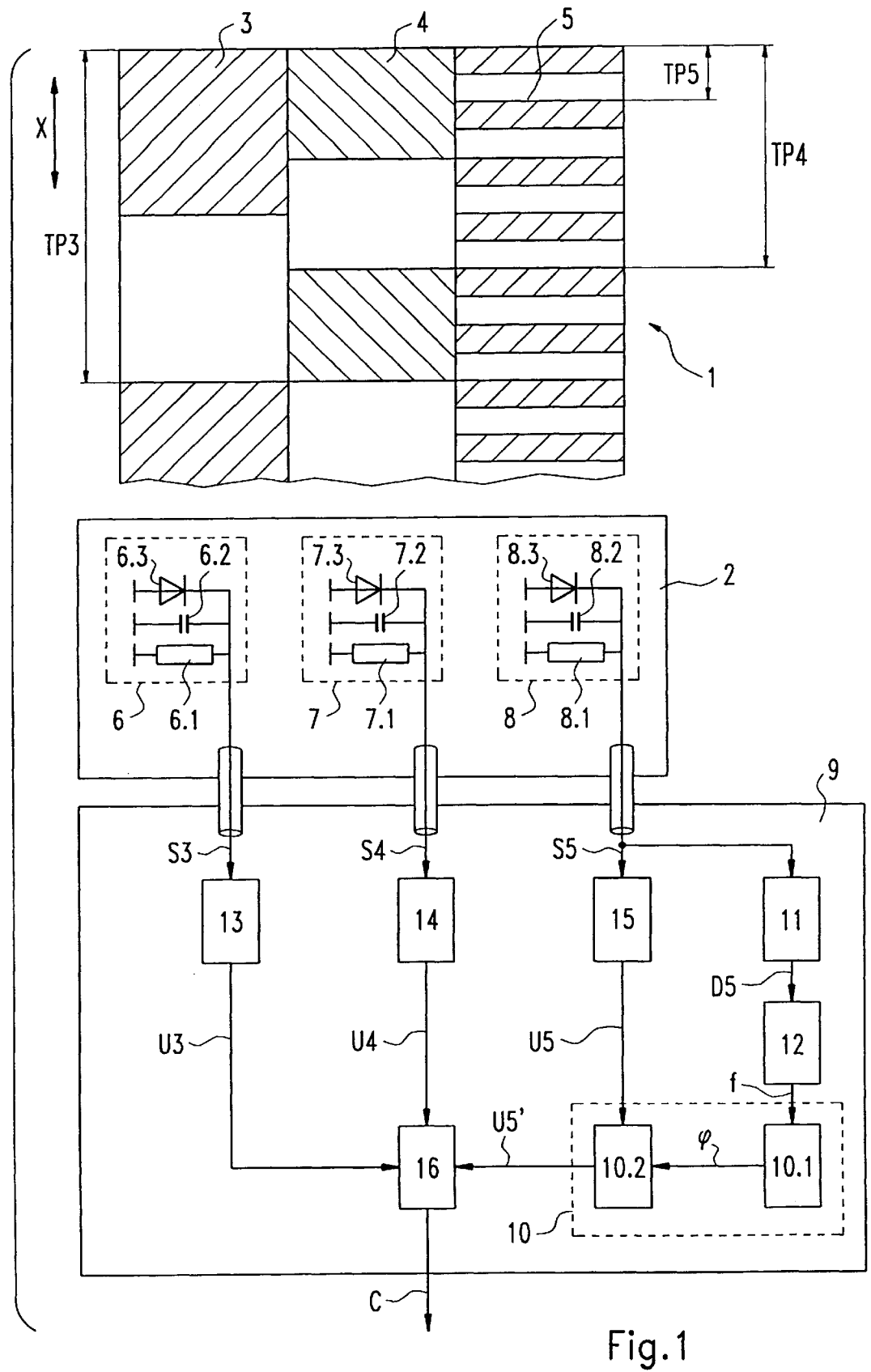
FIG. 1 is a schematic illustration of a position-measuring device according to a preferred embodiment of the present invention.

FIG. 1 is a schematic illustration of a position-measuring device according to a preferred embodiment of the present invention. The device includes a scale 1, a scanning device 2 and an evaluation unit 9. The scale 1 is displaceable in the measuring direction X with relation to the scanning device 2. The scale 1 has several graduation tracks 3, 4, 5, each with a different graduation period TP3, TP4 and TP5 as shown. Each graduation track 3, 4, 5 is scanned by a scanning element 6, 7, 8 respectively. The scanning elements 6, 7, 8 generate analog signals S3, S4, S5 having signal periods P3, P4, P5 (see FIGS. 2a–c). In FIG. 1, the scanning elements 6, 7, 8 are schematically represented in the form of equivalent circuit diagrams. Each scanning element 6, 7, 8 includes a photoelectric element 6.1, 7.1, 8.1, which by itself or in connection with downstream connected amplifier circuits displays a low-pass filter behavior. This low-pass filter behavior is schematically represented by resistors 6.2, 7.2, 8.2 and capacitors 6.3, 7.3, 8.3.

The scanning signals S3, S4, S5 are input to an evaluation unit 9, where an absolute position is determined in a well-known manner by a combination or phase comparison of the scanning signals S3, S4, S5. The absolute position is output of the evaluation unit 9 in the form of a code word C. The evaluation unit 9 may be physically separate from the scanning device 2, for example, it can be a component of a display unit or a numerical control. Alternatively the evaluation unit 9 may be an integral component of the scanning device 2 and incorporated therein.

Figure 2A:
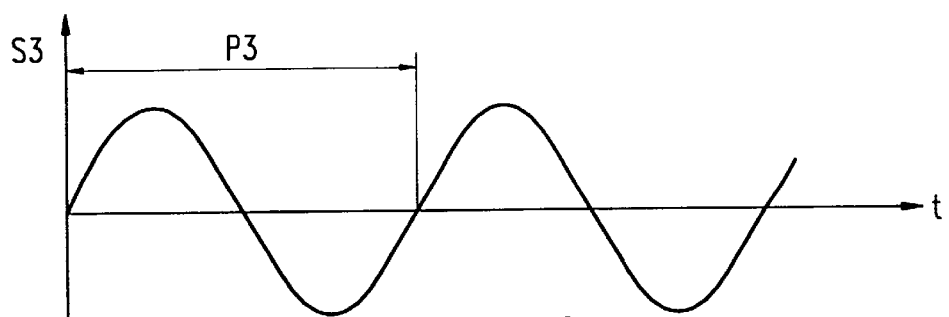
FIGS. 2a–c are graphs illustrating scanning signals generated by the position-measuring device shown in FIG. 1.
Figure 2B:
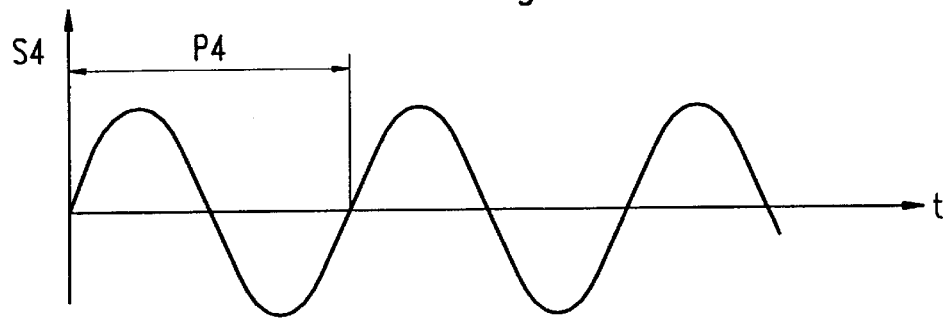
Figure 2C:
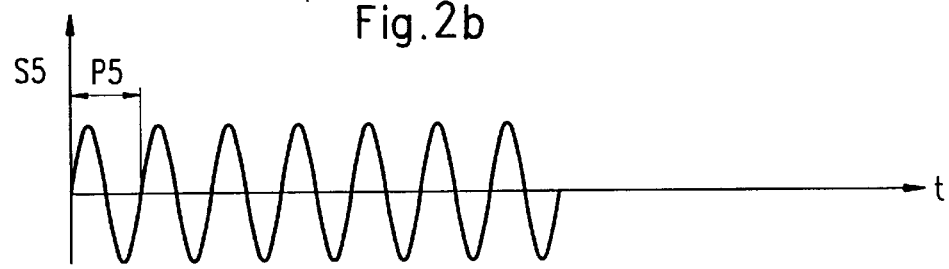
Figure 5:
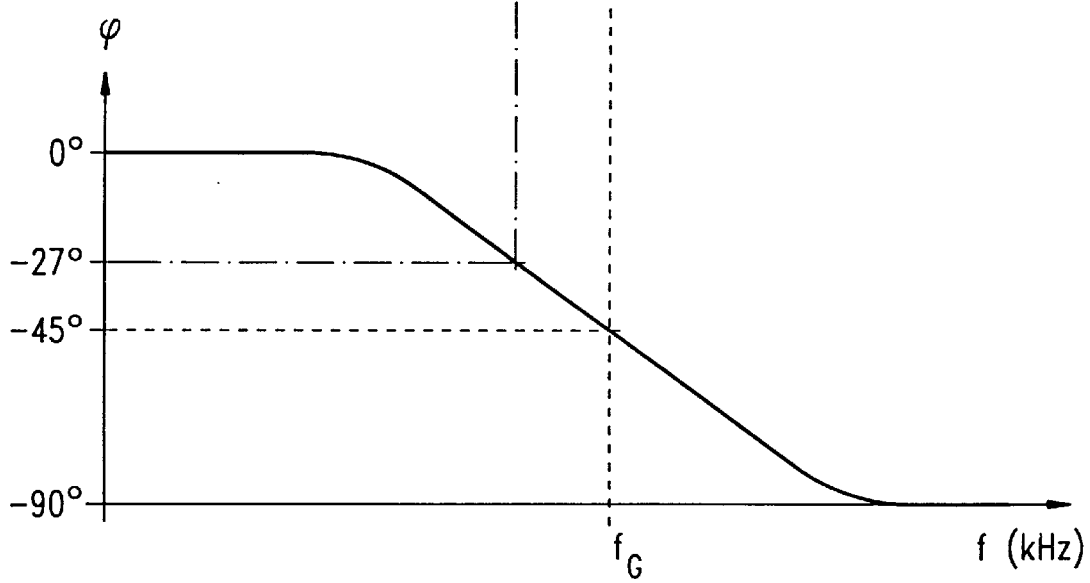
FIG. 5 is a graph of the frequency-dependent phase shift of a scanning signal.

The scanning signals S3, S4, S5 output by the scanning device 2 are represented in FIGS. 2a–c. The scanning signals S3 and S4 have a period P3, P4, which is a multiple of the period P5 of the scanning signal S5. A frequency-dependent phase shift $\phi$ of the scanning signals S3, S4, S5 takes place because of the low-pass filter behavior of the scanning elements 6, 7, 8. The frequency-dependent phase shift of a phase angle φ of scanning element 8, for example, is represented in FIG. 5. It can be seen from this that no phase shift φ is caused by the low frequencies of the scanning signal S5. In the example shown, it is assumed that the graduation periods TP3 and TP4, as well as the maximum relative velocity of the scale 1 in the measuring direction X with relation to the scanning device 2, have been selected such that no phase shift of the scanning signals S3, S4 occurs during operation. The graduation track 5 has the smallest graduation period TP5 and therefore the frequency of this scanning signal S5 is the highest. It is assumed that in operation only this scanning signal S5 can reach a frequency which leads to a noticeable phase shift φ. In accordance with the present invention this phase shift is simply corrected.

To this end, a correction device 10 is provided in the evaluation unit 9 which corrects the scanning signal S5 as a function of the instantaneous frequency f of the scanning signal S5. The dependence of the phase shift φ on the frequency f of the scanning element 8 is already determined prior to the actual position measurement, typically by the manufacturer of the position-measuring device. This can be done by directly measuring the phase shift 4 in degrees for various frequencies f of the scanning signal S5. The graph shown in FIG. 5 is generated in this way. The represented phase dependency φ(f) is also called phase or frequency response.

Figure 4:
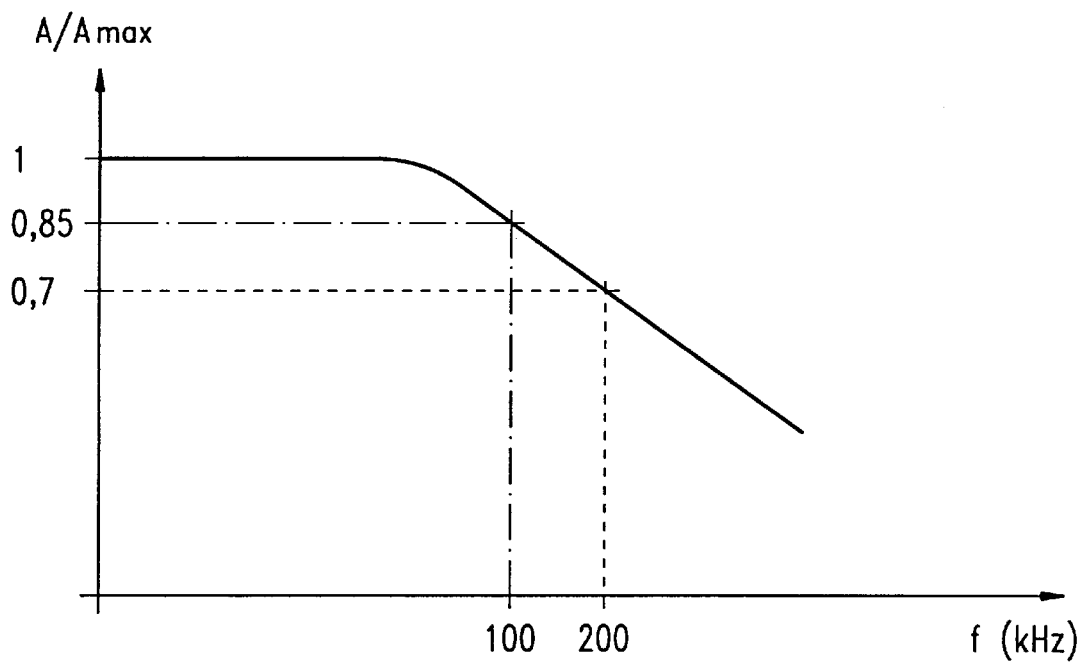
FIG. 4 is a graph of the frequency-dependent amplitude of a scanning signal.

Alternatively, the amplitude A of the scanning signal S5 at different frequencies f can be measured and graphed as shown in FIG. 4. It is known that the limit frequency $f_G$ has been reached at $1/\sqrt{2}=0.7$ of the maximum amplitude $A_{max}$. If, during the calibration process the amplitude reaches A=0.7 of the maximum amplitude, the frequency f of the scanning signal then occurring is assumed to be the limit frequency $f_G$. The frequency response represented in FIG. 5 can be mathematically derived from this limit frequency $f_G$ by means of the equation $\phi = \arctan f/f_G$.

During the calibration process the scanning signal S5 with the variable frequency f can be generated by connecting an oscillator to the scanning element 8 for supplying a signal of the frequency f, or by displacing the scale 1 in the measuring direction X with relation to the scanning element 8 at different velocities.

The dependence of φ(f) obtained during the calibration process is stored in a memory 10.1 in the correction device 10, for example, in the form of a table. During the operation of the position-measuring device, the instantaneous frequency f of the scanning signal S5 is measured and as a function thereof a correction value φ for phase correction is issued. The instantaneous frequency f of the scanning signal can be determined by a velocity measurement. To this end, the periods P5 within a defined length of time are measured, for example. A frequency measurement is schematically represented in FIG. 1. More particularly, a trigger stage 11 converts the analog signal S5 into a rectangular signal U5 and the periods or flanks of the signal U5 are counted in the downstream-connected counter 12. The frequency f can be simply calculated from the number of periods or flanks within a known time period. This frequency f is used to address the memory 10.1. A correction value φ is assigned to each frequency f, which is supplied to a linkage circuit 10.2, which corrects the instantaneous phase of the scanning signal S5 by the correction value.

It is also possible to store only the value for the limit frequency $f_G$ in the memory 10.1 instead of an entire correction table, and the correction value φ can be calculated during the position measurement in real time in accordance with the equation $\phi = \arctan f/f_G$.

Alternatively, the absolute code word C can be generated by a device provided in the evaluation unit 9, to which the scanning signals S3, S4 as well as the corrected scanning signal (S5+φ) are supplied.

In the represented example the absolute code word C is formed by a comparison of the phase response of all scanning signals S3, S4, S5. To this end, each analog scanning signal S3, S4, S5 is supplied to an interpolation circuit 13, 14, 15 in which, for example, each period P3, P4, P5 of the scanning signals S3, S4, S5 is divided (interpolated) into 256 equal parts. Since the graduation periods TP3, TP4, TP5 of the code tracks 3, 4, 5 are different, a defined combination of instantaneous interpolation values U3, U4, U5, and thus an unequivocal code word, is obtained at each position over the entire measurement length. To this end the interpolated values U3, U4 and the corrected interpolated value U5' are supplied to a device 16.

Figure 3:
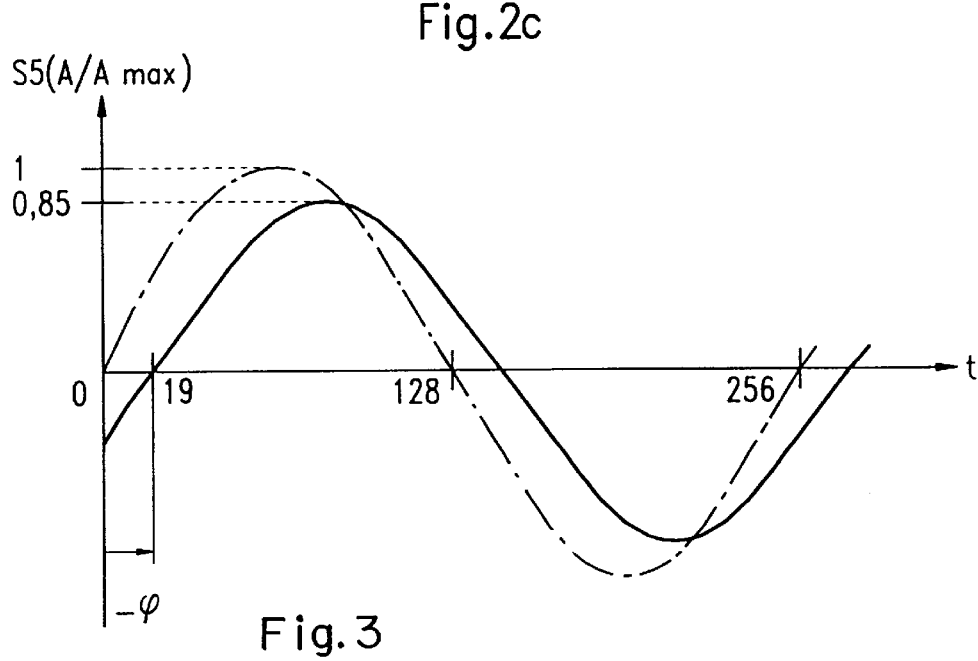
FIG. 3 is a graph of a scanning signal to be corrected and a corrected scanning signal.

One period P5 of the scanning signal S5 is represented in FIG. 3. The dashed line shows the scanning signal S5 without a phase shift φ with the standardized maximum amplitude 1. The solid line shown in FIG. 3 is generated by the scanning element 8 at a frequency of the scanning signal S5 of f=100 kHz. It can be determined from the diagrams in FIGS. 4 and 5 that at f=100 kHz, the amplitude is only 0.85 of the maximum amplitude, and that the scanning signal is phase-shifted by φ=27° as well. If a period P is divided into 256 parts by the interpolation circuit 15, then 27°=19 parts. It follows from this that at the frequency f=100 kHz each interpolated value U5 of the scanning signal S5 must be corrected by 19 parts. To this end the correction value φ=19 is stored in the memory 10.1 for f=100 kHz, and a simple addition, U5'=U5+19, takes place in the linkage circuit 10.2.

Another correction method is also possible in place of mathematical addition. In many cases a table is used for the division of sinusoidal scanning signals, wherein two scanning signals of the same frequency, which are phase-shifted by 90° with respect to each other, are present as addresses, and where a division value is issued as a function of the instantaneous values of these scanning signals. This table can be displaced by the steps to be corrected for a correction of a phase error φ, so that a value corrected by, for example 19 steps, is issued.

The frequency f=100 kHz corresponds to a relative velocity of the scale 1 of 1.6 m per sec. at a graduation period TP5 of 16 mm.

If it should be required, further scanning signals can also be corrected in accordance with the present invention. It is furthermore also possible to provide more than three graduation tracks. The code word C does not necessarily have to be generated by the combination or comparison of divisional values, the graduation tracks can also form a Gray code.

In many cases an electronic sequential device, for example, a numerical control, is additionally provided besides the absolute position value C, with the analog scanning signal of the most precise graduation track. It is therefore possible to additionally perform an incremental position measurement in the electronic sequential device. It is also known to compare this determined incremental measured position value with the absolute position C in order to detect error functions of the position-measuring device and transmission errors. In order to be also able in this case to obtain a correct relationship between the absolute position value C and the incremental position value, it is advantageous to correct the other scanning signals S3 and S4 by the phase angle (−φ) instead of the scanning signal S5. In this case the scanning signal S5 with the phase shift φ is used as the reference with which the other scanning signals S3, S4 must be synchronized.

Preferably not only the mentioned scanning signals are supplied to the evaluation unit, but also the scanning signals phase-shifted by 90° with relation thereto. This has the advantage that a detection of the movement direction as well as a simple division of the scanning signals becomes possible in a simple, known manner.

The graduation track with the smallest graduation period can also be used for incremental position measuring.

The term scanning element also includes the entire circuitry of the photoelectric element, and also possibly downstream connected amplifier modules.

The invention is not limited to the photoelectrical scanning principle, but can be used in connection with photoelectrical, capacitive, magnetic and inductive length as well as angular measuring devices.

It is to be understood that the forms of the invention as described herein are to be taken as preferred examples and that various changes in the shape, size and arrangement of parts may be resorted to, without departing from the spirit of the invention or scope of the claims.

What is claimed is:

1. A position-measuring method wherein several graduation tracks of a scale are scanned by several scanning elements of a scanning device which output scanning signals, wherein the phase condition of the scanning signals in relation to each other is frequency-dependent, the method comprising the steps of:
   (a) determining the instantaneous frequency of at least one of the scanning signals;
   (b) determining a correction value ($\phi$) as a function of the instantaneous frequency determined in step (a); and
   (c) correcting the phase condition of at least one of the scanning signals by adding the correction value ($\phi$) to an instantaneous value of at least one of the scanning signals.

2. A position-measuring device with a scale having several graduation tracks of different graduation periods, which are scanned by several scanning elements, wherein the scanning elements generate position-dependent electrical scanning signals with different frequencies, and wherein the phase-condition of the electrical scanning signals against each other are frequency-dependent as a result of a frequency-dependent phase shift of the scanning elements, the device comprising:
   a correcting device for correcting this frequency-dependent phase-condition;
   a first module for the determination of the instantaneous frequency value of one of the scanning signals;
   a second module coupled to the first module and receiving the instantaneous frequency from the first module which, as a function of the instantaneous frequency, outputs a correction value ($\phi$), which is combined in a linkage circuit with one of the scanning signals, and that the second module has a memory, in which at least one value, which defines the frequency-dependent phase shift of a scanning element, is stored.

3. The position-measuring device according to claim 2, wherein a limit frequency ($f_G$) of a scanning element of the one of the scanning signals is stored in the memory, and that the correction value is determined in accordance with the following equation:

$$\phi = \arctan f/f_g.$$

4. The position-measuring device according to claim 2, wherein a table of correction values ($\phi$) as a function of the frequency (f) is stored in a memory, wherein the frequency (f) is the address for reading out a defined correction value ($\phi$) from this table.

5. The position-measuring device according to claim 2, wherein each signal period of the scanning signals is divided in interpolation circuits into a predetermined number of steps, and that the instantaneous division values of the scanning signals are supplied to a device for forming an actual position (C).

6. the position-measuring device according to claim 5, wherein the correction value ($\phi$) is a defined number of steps, which is added to the division value of the scanning signal to be corrected.

7. A position-measuring method wherein several graduation tracks of a scale are scanned by several scanning elements of a scanning device and several electrical scanning signals are generated by the scanning elements where in the phase-condition of the electrical scanning signals against each other are frequency-dependent as a result of a frequency-dependent phase shift of the scanning elements, and wherein the frequency-dependent phase-condition of the scanning signals of the scanning elements is corrected in a correction device, the method comprising the steps of:
   (a) determining the instantaneous frequency of one of the scanning signals;
   (b) determining a correction value ($\phi$) as a function of the instantaneous frequency (f); and
   (c) correcting at least one of the scanning signals by linkage of the instantaneous value of the scanning signal with the correction value ($\phi$).

8. A position measuring device according to claim 7 wherein a table of correction values ($\phi$) is stored in a memory, wherein each correction value is associated with a particular frequency of the scanning signal wherein the frequency of the scanning signal is the address for reading out a correction value ($\phi$) from this table.

9. A position measuring device with a scale having several graduation tracks of different graduation periods which are scanned by several scanning elements wherein the scanning elements generate position-dependent scanning signals, the device comprising:
   a first module for the determination of an instantaneous frequency value of one of the scanning signals;
   a second module coupled to an output of the first module, the second module having a memory in which is stored a table of phase shift values dependent upon instantaneous frequency values wherein the second module outputs a correction value ($\phi$) based upon the instantaneous frequency value determined by the first module;
   a linkage unit coupled to the output of the second module and an output of the scanning element of the one of the scanning signals wherein the correction value ($\phi$) is combined with the one of the scanning signals to generate a corrected instantaneous interpolation value for correcting a frequency-dependent phase condition of the one of the scanning signals.

10. A position measuring device with a scale having several graduation tracks of different graduation periods which are scanned by several scanning elements wherein the scanning elements generate position-dependent scanning signals, the device comprising:
   a second module for outputting a correction value ($\phi$);
   a linkage unit coupled to the output of the second module and an output of a scanning element, wherein the linkage unit receives a scanning signal from the scanning elements and the correction value (φ) output by the second module and combines the correction value (φ) with the scanning signal to generate a corrected interpolation value; and a first module coupled to an input of the second module for determining an instantaneous frequency value of the scanning signal and wherein the second module has a memory in which is stored the correction values wherein each correction value is associated with a particular instantaneous frequency of the scanning signal.

11. A position measuring device with a scale having several graduation tracks of different graduation periods which are scanned by several scanning elements wherein the scanning elements generate position-dependent scanning signals, the device comprising:

a second module for outputting a correction value (φ);

a linkage unit coupled to the output of the second module and an output of a scanning element, wherein the linkage unit receives a scanning signal from the scanning elements and the correction value (φ) output by the second module and combines the correction value (φ) with the scanning signal to generate a corrected interpolation value;

a first module coupled to an input of the second module for determining an instantaneous frequency value of the scanning signal and wherein the second module has a memory in which is stored the correction values wherein each correction value is associated with a particular instantaneous frequency of the scanning signal; and wherein a limit frequency ($f_g$) of the scanning signal is stored in a memory, and the correction value is determined in accordance with the following equation:

$$(\phi) = \arctan f/f_g.$$

* * * * *

UNITED STATES PATENT AND TRADEMARK OFFICE
CERTIFICATE OF CORRECTION

PATENT NO. : 6,029,118
DATED : February 22, 2000
INVENTOR(S) : Erich Strasser

It is certified that error appears in the above-identified patent and that said Letters Patent is hereby corrected as shown below:

<u>Claim 6,</u>
Line 1, delete "the" and substitute -- The -- in its place.

Signed and Sealed this

Sixteenth Day of October, 2001

Attest:

*Nicholas P. Godici*

NICHOLAS P. GODICI
*Attesting Officer*   *Acting Director of the United States Patent and Trademark Office*